United States Patent [19]

Hawk et al.

[11] 4,017,013
[45] Apr. 12, 1977

[54] MULTIPLE FIBER END PREPARATION

[75] Inventors: Robert M. Hawk, Bath; Jerome G. Racki, Painted Post, both of N.Y.

[73] Assignee: Corning Glass Works, Corning, N.Y.

[22] Filed: Dec. 16, 1975

[21] Appl. No.: 641,341

[52] U.S. Cl. .................................. 225/96.5; 225/101
[51] Int. Cl.² ........................................ B26F 3/00
[58] Field of Search ............... 225/2, 96.5, 97, 100, 225/101; 269/60; 350/96 WG

[56] References Cited

UNITED STATES PATENTS

| 3,239,116 | 3/1966 | Hulak | 225/101 X |
| 3,934,773 | 1/1976 | Chinnock et al. | 225/2 |

OTHER PUBLICATIONS

Glodge; D. et al., "Optical Fiber End Preparation for Low–Loss Splices." *The Bell System Technical Journal*, 52 (Nov. 1973), USA, 1973, p. 1584.

*Primary Examiner*—Frank T. Yost
*Attorney, Agent, or Firm*—William J. Simmons, Jr.; Walter S. Zebrowski; Clarence R. Patty, Jr.

[57] ABSTRACT

An apparatus for severing the ends of a plurality of parallel optical fibers so that the endfaces thereof are relatively flat, are substantially perpendicular to the fiber axes and are relatively coplanar. The fibers are bent over an arcuate surface and are slidably clamped between the flat surfaces of two pieces of rubbery material. The clamp is urged by a spring in such a direction that the fibers are in tension. After one fiber is scored and breaks, the clamp automatically slides along the remaining fibers until the clamping force on those fibers is sufficient to prevent further sliding. The fibers are individually severed in this manner.

10 Claims, 5 Drawing Figures

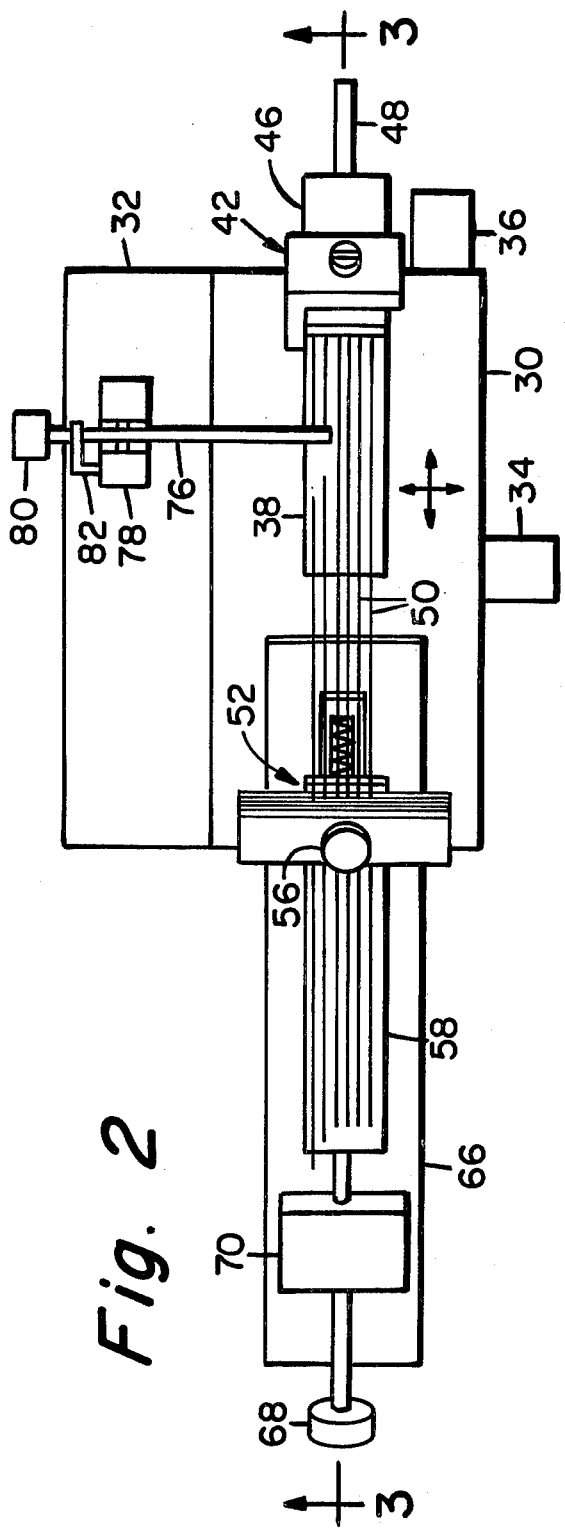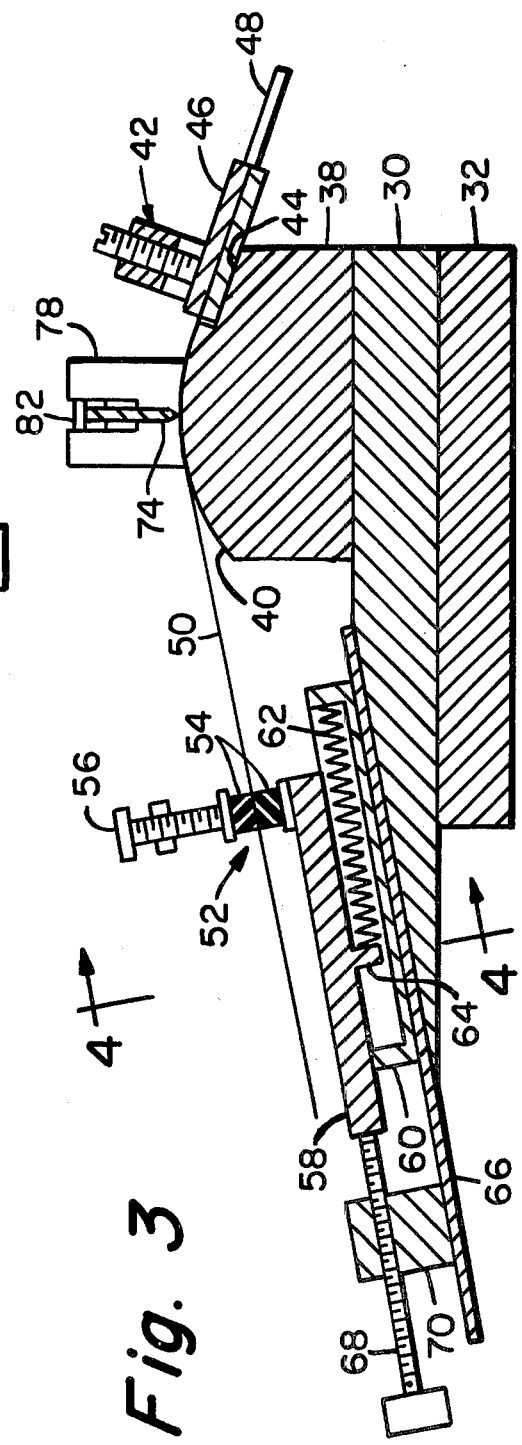

MULTIPLE FIBER END PREPARATION

BACKGROUND OF THE INVENTION

Recent advances in the fabrication of ultratransparent materials have demonstrated that fibers are a promising transmission medium for optical communication systems. These light transmitting fibers, which are referred to as optical waveguides, generally consist of a transparent core surrounded by a layer of transparent cladding material having a refractive index which is lower than that of the core. A low loss optical waveguide and a method of making the same are disclosed in U.S. Pat. No. 3,659,915. The waveguide described in that patent comprises a cladding layer of fused silica and a core of fused silica doped with one or more materials that selectively increase the refractive index of the core above that of the cladding.

To provide redundancy in the case of fiber breakage and/or to provide for the simultaneous transmission of a plurality of optical signals, such fibers are usually grouped together in bundles or ribbons. However, if such fibers are to be readily used in this manner, it is evident that there must be a quick, convenient and accurate means of connecting sections of fibers together in the course of their use. Devices for connecting ribbons and bundles of optical fibers are respectively disclosed in U.S. Pat. No. 3,864,018 issued to C. A. Miller and U.S. patent application Ser. No. 498,329 entitled "Optical Waveguide Connector." filed Aug. 19, 1974 by R. M. Hawk. Both of these connectors require that the optical fibers be disposed in linear arrays, the fiber endfaces being substantially perpendicular to the fiber axes and being substantially coplanar. Thus, when the fibers from each bundle or ribbon are disposed in the connector, all of the corresponding pairs of fibers to be connected are in virtual contact. If the endfaces of each fiber array are not coplanar, end separation will occur between some of the fiber pairs to be connected, resulting in an additional loss at that junction.

A method for preparing the end of a single optical fiber such that the endface thereof is substantially flat and perpendicular to the axis thereof is disclosed by D. Gloge et al. in their publication entitled "Optical Fiber End Preparation for Low-Loss Splices," Bell System Technical Journal, Vol. 52, November, 1973, pp. 1579–1588. This publication discloses a reliable method of breaking an optical fiber to obtain a flat, perpendicular endface by controlling the stress distribution in the fracture zone of the fiber. Depending upon the Young's modulus of the fiber material and the diameter of the fiber, the fiber is bent to the required radius and is subjected to the required tension for achieving the aforementioned stress distribution therein. By lightly scoring the fiber periphery, a break is initiated and propagates through the fiber to provide an optically smooth endface.

The apparatus disclosed in the aforementioned Gloge et al. publication employs two non-slip fiber clamps, one of which is mounted on a spring steel bar. The fiber is slidably retained by a fiber guide and passes over a curved form. By raising the form the displacement of the fiber from its original linear disposition puts the fiber into a state of tension, the extent of which can be measured by a tension guage which measures the mechanical displacement of the steel bar. If a plurality of fibers were clamped into this apparatus and the tension increased in accordance with the number of fibers, the tension on each fiber would not necessarily be equal. Furthermore, after one fiber became severed, the tension on each of the remaining fibers would increase. To provide each fiber with its own tension applying clamp and tension gauge would result in an apparatus so unwieldy as to be useless for field use.

SUMMARY OF THE INVENTION

It is therefore an object of the present invention to provide an apparatus for severing a plurality of parallel optical fibers so that the ends thereof have optically smooth surfaces which are substantially coplanar.

Briefly, the end preparation apparatus of the present invention comprises means defining an arcuate surface over which a plurality of fibers are adapted to be disposed. First clamp means is disposed at one end of the surface for fixedly clamping the fibers. Second clamp means, disposed at that side of the surface opposite the fixed clamp, slidably clamps the fibers with a frictional force. The second clamp means is movable along a line extending from the first clamp means. Means is provided for applying to the second clamp means a force tending to urge the second clamp means away from the first clamp means, the force decreasing as the distance between the first and second clamp means increases. Means is disposed adjacent to the arcuate surface for scoring the fibers.

BRIEF DESCRIPTION OF THE DRAWINGS

FIG. 2 is a top plan view of the apparatus of the present invention.

FIG. 3 is a cross-sectional view taken along lines 3—3 of FIG. 2.

DETAILED DESCRIPTION

Figure 1:
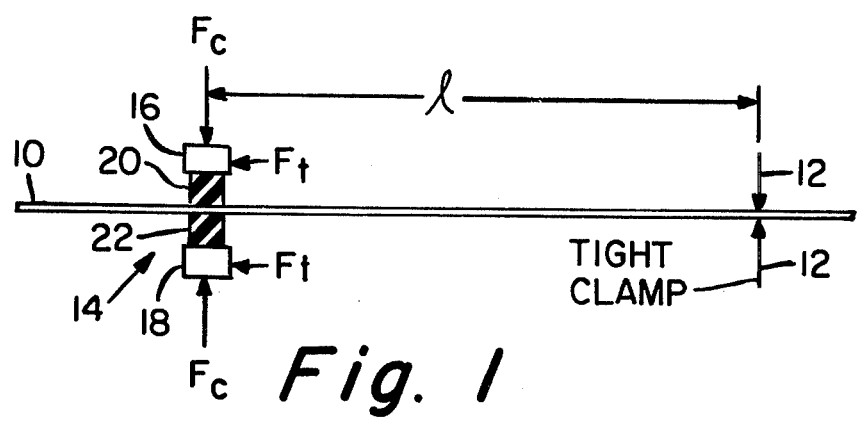
FIG. 1 is a schematic diagram which illustrates the basic principles of the present invention.

Referring to FIG. 1, there is shown a diagram which illustrates the basic principles of the present invention as applied to a single fiber 10. The fiber is tightly clamped at a point along its length as indicated by arrows 12. A second clamp 14 slidably clamps fiber 10 with a frictional force a distance $l$ from the first clamp 12. Clamp 14 comprises two rigid support members 16 and 18 between which are disposed two blocks 20 and 22 of a low modulus elastomeric material such as silicone rubber. A clamping force $F_c$ is applied to members 16 and 18, causing them to urge blocks 20 and 22 against fiber 10 with a frictional force which depends inter alia upon force $F_c$. A force $F_t$ is then applied to clamp 14 in a direction tending to urge that clamp away from clamp 12, the force $F_t$ decreasing as the distance $l$ increases. If the force $F_t$ is greater than the frictional force with which clamp 14 tends to retain fiber 10, clamp 14 will be urged away from clamp 12 so that the distance $l$ increases and the force $F_t$ decreases until the force $F_t$ is reduced to an equilibrium value which is insufficient to cause further sliding of clamp 14. The force $F_c$ can be adjusted so that the force $F_t$ exerts a desired amount of axial tension in waveguide 10 between the two clamps.

To initiate a predetermined amount of tension in waveguide 10, clamp 12 is tightly fixed against the fiber and clamp 14 is applied to the fiber at some minimum distance $l_m$ away from clamp 12. While maintaining clamp 14 in its initial position, a predetermined amount of force $F_c$ is applied. Clamp 14 is then released so it is free to move away from clamp 12 until an equilibrium position is reached wherein the predetermined amount of tension is applied to fiber 10. At the same time fiber 10 is bent in a predetermined radius in accordance with the teachings of the aforementioned Gloge et al. publication while the fiber is lightly scored to initiate a break which results in a planar, optical quality endface that is substantially perpendicular to the fiber axis.

Figure 4:
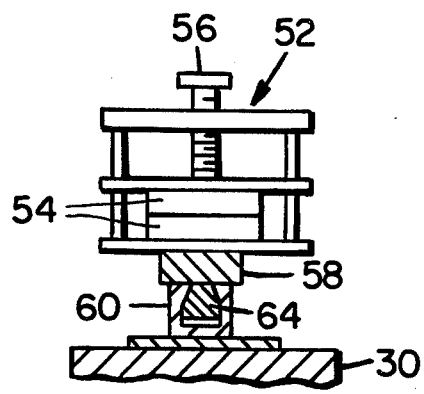
FIG. 4 is a cross-sectional view taken along lines 4—4 of FIG. 3 and is limited to the slidable clamp and its support means.

An apparatus for implementing the principles illustrated in FIG. 1 is shown in FIGS. 2–4. The fiber end preparation apparatus is mounted on a 2-axis micropositioner. Table 30 can be moved in the directions of the crossed arrows with respect to base 32 by rotating adjustment screws 34 and 36. A radius block 38 having an arcuate surface 40 having a predetermined radius of curvature is disposed on table 30. A fixed fiber clamp 42 is disposed at one end of surface 40. A notch 44 receives one end of a fiber connector subassembly which may be of the type disclosed in U.S. patent application Ser. No. 592,362 filed July 2, 1975 and entitled "Optical Waveguide Connector." A cable 48 of optical waveguide fibers extends from one end of subassembly 46 while six parallel fibers 50 extend from the other end thereof along surface 40. Alternatively, subassembly 46 could consist of a fiber ribbon of the type disclosed in U.S. Pat. No. 3,871,935, the fibers 50 being exposed by peeling back or otherwise removing the protective jacket in which the fibers are encased.

Fibers 50 extend beyond surface 40 and through slidable clamp 52. Clamp 52 comprises two blocks 54 of deformable material which frictionally engage fibers 50. An adjustment screw 56 is provided for applying a clamping force to blocks 54. Clamp 52 is mounted on an elongated support member 58 which slides along the upper surface of spring housing 60. A spring 62 disposed in housing 60 is compressed between one end of the housing and a dovetail tab 64 protruding from the bottom of support member 58. The walls of housing 60 flare inwardly as shown in FIG. 4 to retain tab 64.

Housing 60 is disposed on a rectangular platform 66 which is affixed to table 30. Adjustment screw 68 extends through a tapped bore in bracket 70 and engages the end of support member 58. Member 58 can be moved by rotating screw 68 to compress spring 62 and move clamp 52 toward clamp 42.

Scorer blade 74 extends downwardly from arm 76 which pivots in bracket 78. The desired blade pressure can be obtained by adjusting counterbalance 80. A stop 82 prevents blade 74 from falling below some predetermined height with respect to surface 40. Blade 74 can be caused to move across surface 40 by rotating screw 34, thereby moving table 30 toward bracket 78 which is mounted on base 32.

To operate the disclosed apparatus screw 68 is rotated to cause member 58 to move toward radius block 38 and to compress spring 62. Screw 56 is loosened to permit blocks 54 to separate a sufficient distance. Optical fibers 50 which extend from connector subassembly 46 are inserted into the space between blocks 54, subassembly 46 is inserted into notch 44 and is tightly clamped therein by clamp 42. Fibers 50 are properly spaced within clamp 52 which is then tightened by rotating screw 56. The required number of turns of screw 56 which provides clamp 52 with the required clamping force is determined in advance by clamping one end of a fiber in clamp 52 and attaching the other end thereof to a force measuring gauge. Screw 56 is rotated until the clamping force on the fiber is just sufficient to prevent the fiber from sliding when the fiber is pulled with a predetermined force. That particular adjustment position of screw 56 is noted for future use of the apparatus.

Figure 5:
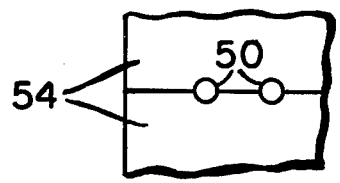
FIG. 5 is an enlarged sectional view showing the fibers held by the clamp.

The preferred deformable material for use in blocks 54 is a silicone rubber commercially available as Garlock Grade 9640. This material is an elastomer having a medium hardness, i.e. a hardness of about 60 points on the dorometer scale. The mutually contacting surfaces of blocks 54 are preferably smooth, and the thickness of the blocks in a direction perpendicular to fibers 50 is preferably large compared to the diameter of the optical fibers. Under these conditions, the deformable material will completely surround fibers 50 when clamp 52 is tightened as illustrated in FIG. 5, and substantially equal forces will be applied to each fiber around the circumference thereof. The deformable material is preferably homogeneous, i.e. it is preferably free from course fillers such as fibers and the like.

When the aforementioned preferred silicone rubber was employed in an apparatus for severing optical waveguide fibers of the type disclosed in the aforementioned U.S. Pat. No. 3,659,915, it was found that after a minimal adequate force was applied to blocks 54 by tightening screw 56, further tightening did not apply an excessive frictional force to fibers 50. Thus, a fiber severing apparatus employing the aforementioned silicone rubber in the slidable clamp 52 was substantially insensitive to adjustment of screw 56, provided that some minimal amount of clamping force had been achieved.

The apparatus of the present invention was designed to sever high silica content optical waveguides of the type disclosed in the aforementioned U.S. Pat. No. 3,659,915. To sever commercially available waveguides having an outer diameter of about 125 micrometers, the radius of surface 40 may be 5.7 cm. In accordance with the aforementioned Gloge et al. publication, using a 5.7 cm. radius of curvature form, clean fractures are produced by employing breaking tensions in the range of 125–175 g. After screw 56 has been adjusted to provide an amount of tension in fibers 50 within the aforementioned range, screw 68 is backed off a sufficient distance from support member 58. Spring 62 forces member 58 toward screw 68 causing clamp 52 to slide along waveguides 50 until an equilibrium condition is reached wherein the spring force is balanced by the frictional force of clamp 52 on fibers 50. Assuming that the amount of force exerted by clamp 52 on each of the six fibers 50 is such that clamp 52 pulls on fibers 50 with a 150 gram force, the total force on the six fibers is about 900 grams. In this initial condition of operation, spring 62 is almost fully compressed.

Table 30 is moved toward blade 74 by turning screw 34. As the blade passes over the first waveguide encountered, it scores the surface thereof, thereby initiating a complete fracture. Since only five fibers remain in tension, the total force applied by spring 62 is greater than the total frictional force on the remaining fibers. Clamp 54 is therefore urged by spring 62 away from fibers. Clamp 54 is therefore urged by spring 62 away from radius block 38 until a new equilibrium condition is established whereby about 750 grams of force is exerted on the remaining fibers. Thus, each of the remaining fibers still has about 150 grams tensional force applied thereto. Table 30 is again moved to cause blade 74 to score the second optical waveguide. After that waveguide becomes severed clamp 52 again moves away from radius block 38 to reestablish an equilibrium condition wherein about 150 grams of tensional force exists in each of the four remaining fibers. This is the condition illustrated in FIG. 2. Each of the remaining fibers is in turn severed, and clamp 52 quickly slides to its next equilibrium condition. Thus, each fiber is subjected to an amount of tension within an allowed range during the time that the surface thereof is scored to initiate fracture. In this manner, any number of parallel fibers can be severed to obtain optically smooth, substantially coplanar endfaces.

We claim:

1. An apparatus for severing a plurality of glass fibers comprising:
    means defining an arcuate surface over which said fibers are adapted to be disposed,
    first clamp means at one end of said surface for fixedly clamping said fibers with a force that is sufficient to prevent said fibers from sliding therethrough,
    second clamp means disposed at that side of said surface opposite said fixed clamp means for loosely clamping said fibers with a frictional force that is less than that force applied by said first clamp means so that fibers clamped by said second clamp means can slide therethrough if a pulling force is applied thereto which is greater than said frictional force, said second clamp means being movable in a direction extending from said arcuate surface defining means,
    means for applying to said second clamp means a force tending to urge said second clamp means away from said arcuate surface defining means, said force decreasing as the distance between said first and second clamp means increases, and
    means disposed adjacent to said arcuate surface for scoring said fibers.

2. The apparatus of claim 1 wherein said second clamp means comprises first and second blocks of deformable material between which said fibers are adapted to pass and means for urging said blocks into mutual contact.

3. The apparatus of claim 2 wherein that portion of each of said blocks which is adapted to contact said fibers is a smooth, flat, rectangular surface.

4. The apparatus of claim 3 wherein said blocks are made of an elastomer material.

5. The apparatus of claim 4 wherein said elastomer material is silicone rubber.

6. The apparatus of claim 4 wherein said second clamp means is disposed on a support member which is adapted to move along a line extending from said first clamp means and wherein said force applying means comprises a spring which tends to urge said member away from said first clamp means.

7. The apparatus of claim 6 further comprising adjustable means for urging said second clamp means toward said first clamp means and simultaneously increasing the force applied by said spring to said support member.

8. The apparatus of claim 7 further comprising means for moving said fiber scoring means with respect to said arcuate surface defining means so that said fibers can be independently severed.

9. An apparatus for severing a plurality of glass fibers comprising:
    means defining an arcuate surface over which said fibers are adapted to be disposed,
    first clamp means at one end of said surface for fixedly clamping said fibers,
    a support member disposed at that side of said surface opposite said fixed clamp and being movable along a line extending from said arcuate surface defining means,
    second clamp means disposed on said support member for slidably clamping said fibers with a frictional force,
    means for applying to said second clamp means a force tending to urge said second clamp means away from said arcuate surface defining means, said force decreasing as said second clamp means moves away from said arcuate surface defining means, and
    means disposed adjacent to said arcuate surface for scoring said fibers.

10. The apparatus of claim 9 wherein said second clamp means comprises first and second pieces of elastomer material between which said fibers are adapted to pass and means for urging said pieces of elastomer material into mutual contact.

* * * * *